(12) United States Patent
Ogawa

(10) Patent No.: US 11,645,023 B2
(45) Date of Patent: May 9, 2023

(54) INFORMATION PROCESSING APPARATUS WITH WARNINGS FOR A PRINT SETTING SCREEN, CONTROL METHOD THEREOF, AND STORAGE MEDIUM

(71) Applicant: CANON KABUSHIKI KAISHA, Tokyo (JP)

(72) Inventor: Nobuhiro Ogawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/484,621

(22) Filed: Sep. 24, 2021

(65) Prior Publication Data
US 2022/0137902 A1 May 5, 2022

(30) Foreign Application Priority Data

Oct. 30, 2020 (JP) .............................. JP2020-182780

(51) Int. Cl.
*G06F 3/12* (2006.01)
(52) U.S. Cl.
CPC .......... *G06F 3/1259* (2013.01); *G06F 3/1203* (2013.01); *G06F 3/1229* (2013.01); *G06F 3/1258* (2013.01)
(58) Field of Classification Search
CPC .... G06F 3/1203; G06F 3/1231; G06F 3/1258; G06F 3/1253

USPC ...................................... 358/1.15, 1.14, 1.16
See application file for complete search history.

(56) References Cited

U.S. PATENT DOCUMENTS

| 7,265,857 | B1* | 9/2007 | Murata | G06F 3/1204 |
| | | | | 358/1.14 |
| 2002/0089688 | A1* | 7/2002 | Ferlitsch | G06F 3/1234 |
| | | | | 358/1.14 |
| 2008/0124093 | A1 | 5/2008 | Kai | 399/9 |
| 2008/0144087 | A1* | 6/2008 | Mitsui | G06F 3/1204 |
| | | | | 358/1.15 |
| 2012/0050803 | A1* | 3/2012 | Ebuchi | G06F 3/1255 |
| | | | | 358/1.15 |
| 2021/0084191 | A1 | 3/2021 | Ogawa | H04N 1/00421 |
| 2021/0191673 | A1 | 6/2021 | Ogawa | G06Q 10/087 |
| 2021/0303219 | A1 | 9/2021 | Ogawa | G06F 3/1224 |

FOREIGN PATENT DOCUMENTS

JP 2008-015947 1/2008

* cited by examiner

*Primary Examiner* — Jamares Q Washington
(74) *Attorney, Agent, or Firm* — Venable LLP

(57) ABSTRACT

An information processing apparatus includes an obtaining unit configured to obtain status information indicating status of an image output apparatus from the image output apparatus and a display control unit configured to display a setting screen for setting print setting on a display unit. In a case where the obtaining unit fails to obtain the status information and a set value set on the setting screen is changed, the display control unit displays a predetermined warning display on the setting screen.

11 Claims, 13 Drawing Sheets

| ID | SETTING ITEM | PRINT SETTING VALUE 502 | STATUS INFORMATION 503a | STATUS INFORMATION 503b |
|---|---|---|---|---|
| ID-A | IMAGE OUTPUT APPARATUS | PRINTER 1 | PRINTER 1 | PRINTER 2 |
| ID-B | SHEET FEEDING PORT | ROLL 1 | ROLL 1/ROLL 2/MANUAL FEED | ROLL 1/MANUAL FEED |
| ID-C | KIND OF SHEET | PHOTOGRAPH SHEET (THIN) | ROLL 1:<br>PHOTOGRAPH SHEET (THIN)<br>ROLL 2: "OFF-LINE"<br>MANUAL FEED:<br>NORMAL PAPER | ROLL 1:<br>NORMAL PAPER<br>MANUAL FEED:<br>PHOTOGRAPH SHEET (THICK) |
| ID-D | SHEET SIZE | 36 INCHES | ROLL 1: 36 INCHES<br>ROLL 2: "OFF-LINE"<br>MANUAL FEED: A1 | ROLL 1: 36 INCHES<br>MANUAL FEED: A1 |
| ID-E | SHEET DISCHARGE DESTINATION | REAR STACKER | REAR STACKER/BASKET | BASKET |
| ID-F | COLOR MODE | COLOR | COLOR/MONOCHROME | MONOCHROME |
| ID-G | PRIORITY IMAGE QUALITY | LINE DRAWING | LINE DRAWING/POSTER | LINE DRAWING/POSTER |
| ID-H | PRINT QUALITY | FINE | FINE/STANDARD/FAST | FINE/STANDARD/FAST |
| ID-I | ROTATION/PRINT POSITION | NO ROTATION/<br>CENTER ALIGNMENT | ROTATION:<br>NO ROTATION/90° ROTATION<br>PRINT POSITION:<br>LEFT/CENTER/RIGHT ALIGNMENTS | ROTATION:<br>NO ROTATION/90° ROTATION<br>PRINT POSITION:<br>LEFT/CENTER/RIGHT ALIGNMENTS |
| ID-J | NO MARGIN | INVALID | VALID/INVALID | VALID/INVALID |

FIG.5

INFORMATION PROCESSING APPARATUS WITH WARNINGS FOR A PRINT SETTING SCREEN, CONTROL METHOD THEREOF, AND STORAGE MEDIUM

BACKGROUND OF THE INVENTION

Field of the Invention

The present disclosure relates to a technique to control display of print setting in an information processing apparatus capable of communicating with an image output apparatus.

Description of the Related Art

In general, in the case of performing printing, an information processing apparatus selects an image output apparatus such as a printer and sends a print job to the selected image output apparatus, whereby the image output apparatus is caused to execute the printing. The information processing apparatus performs generation of a print job produced by combining various set values including sheet feeding setting such as the kind and size of the sheet, quality setting such as priority image quality and print quality, and layout setting such as rotation and a print position within a range of values supported by the selected image output apparatus. These supported values are mostly obtained by a printer driver installed in advance on the information processing apparatus.

On the other hand, in the image output apparatus, a set value with which printing is possible changes according to change of state such as sheet replacement or main body setting change. Japanese Patent Laid-Open No. 2008-15947 (hereinafter referred to as PTL 1) discloses a technique to present a necessary warning to a user in a case where the status of the image output apparatus is obtained and there arises a mismatch between the obtained status and print setting of the information processing apparatus.

SUMMARY OF THE INVENTION

PTL 1 discloses a technique based on the premise that the status of the image output apparatus can be normally obtained and in a case where the information processing apparatus cannot obtain the status of the image output apparatus, it is impossible to present an appropriate warning to the user.

An information processing apparatus according to an aspect of the present invention is an information processing apparatus configured to be capable of communicating with an image output apparatus including: an obtaining unit configured to obtain status information indicating status of the image output apparatus from the image output apparatus; and a display control unit configured to display a setting screen for setting print setting on a display unit; wherein in a case where the obtaining unit fails to obtain the status information and a set value set on the setting screen is changed, the display control unit displays a predetermined warning display on the setting screen.

Further features of the present invention will become apparent from the following description of exemplary embodiments with reference to the attached drawings.

BRIEF DESCRIPTION OF THE DRAWINGS

FIG. 5 is a diagram showing an example of print setting information stored in a print setting information DB;

DESCRIPTION OF THE EMBODIMENTS

Suitable embodiments of the present invention will be described in detail below with reference to the attached drawings. The following embodiments do not limit the present invention according to the claims and not all of the combinations of features described in the present embodiments are essential as solving means of the present invention.

First Embodiment

Configuration of System

Figure 1:
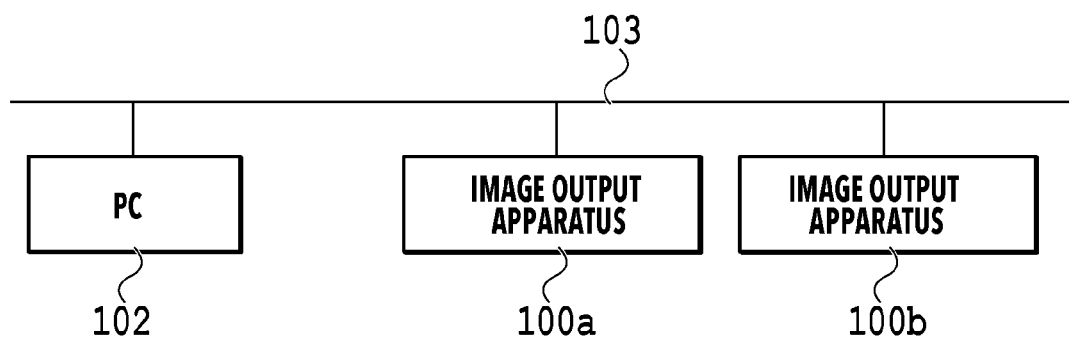
FIG. 1 is a diagram showing a print system.

FIG. 1 is a diagram showing a print system of the present embodiment. The print system of the present embodiment shown in FIG. 1 includes a PC 102 which is an information processing apparatus and a plurality of image output apparatuses 100 (an image output apparatus 100a and an image output apparatus 100b). The PC 102 is configured to be capable of communicating with the image output apparatuses 100 via a network 103. Incidentally, in the present specification, the same reference numeral is assigned to constituents of the same kind and in a case where individual constituents are specifically indicated, an alphabetical letter is assigned at the end of the reference numeral for description. In a case where the constituents of the same kind are wholly described, the description of the alphabetical letter which comes at the end of the reference numeral is sometimes omitted. Although the plurality of image output apparatuses 100 are shown in the example of FIG. 1, the number of the image output apparatuses 100 may be one or may be more than or equal to three. Further, although the number of the PC 102 is one in the example, the number of the PC 102 may be more than or equal to two.

In the present embodiment, although the PC 102 is used as an example of the information processing apparatus, an information terminal such as a smart phone or a tablet may be used as the information processing apparatus. The PC 102 selects, of the plurality of image output apparatuses 100, an image output apparatus 100 to be a target, generates a print job for the image output apparatus 100, and sends the generated print job to the selected image output apparatus 100.

The image output apparatus 100 performs printing operation based on the print job sent from the PC 102. The image output apparatus 100 also stores status information of its own. For example, in a case where the status information is changed due to sheet replacement, device setting, or the like, the image output apparatus 100 stores the status information after the change.

The PC 102 displays a print setting screen according to the operation of a user in a case of generating the print job. The user edits print setting on the print setting screen. In the PC 102, in a case where the print setting is edited, consistency of a print setting value is checked to suppress a print mistake in which desired printing is not performed from occurring. More specifically, the PC 102 obtains the status information about the image output apparatus 100 to determine whether the status information is consistent with the print setting value. In a case where the status information and the print setting value are not consistent with each other, the PC 102 outputs a warning to the user. This can suppress the print mistake from occurring. In the present embodiment, in a case where the status information about the image output apparatus 100 cannot be obtained, the PC 102 outputs a warning indicating that the consistency of the print setting value has not been checked, whereby it can be expected that the print mistake is suppressed even in a case where the status information about the image output apparatus 100 cannot be obtained. The details will be described later.

Configuration of Hardware

Figure 2:
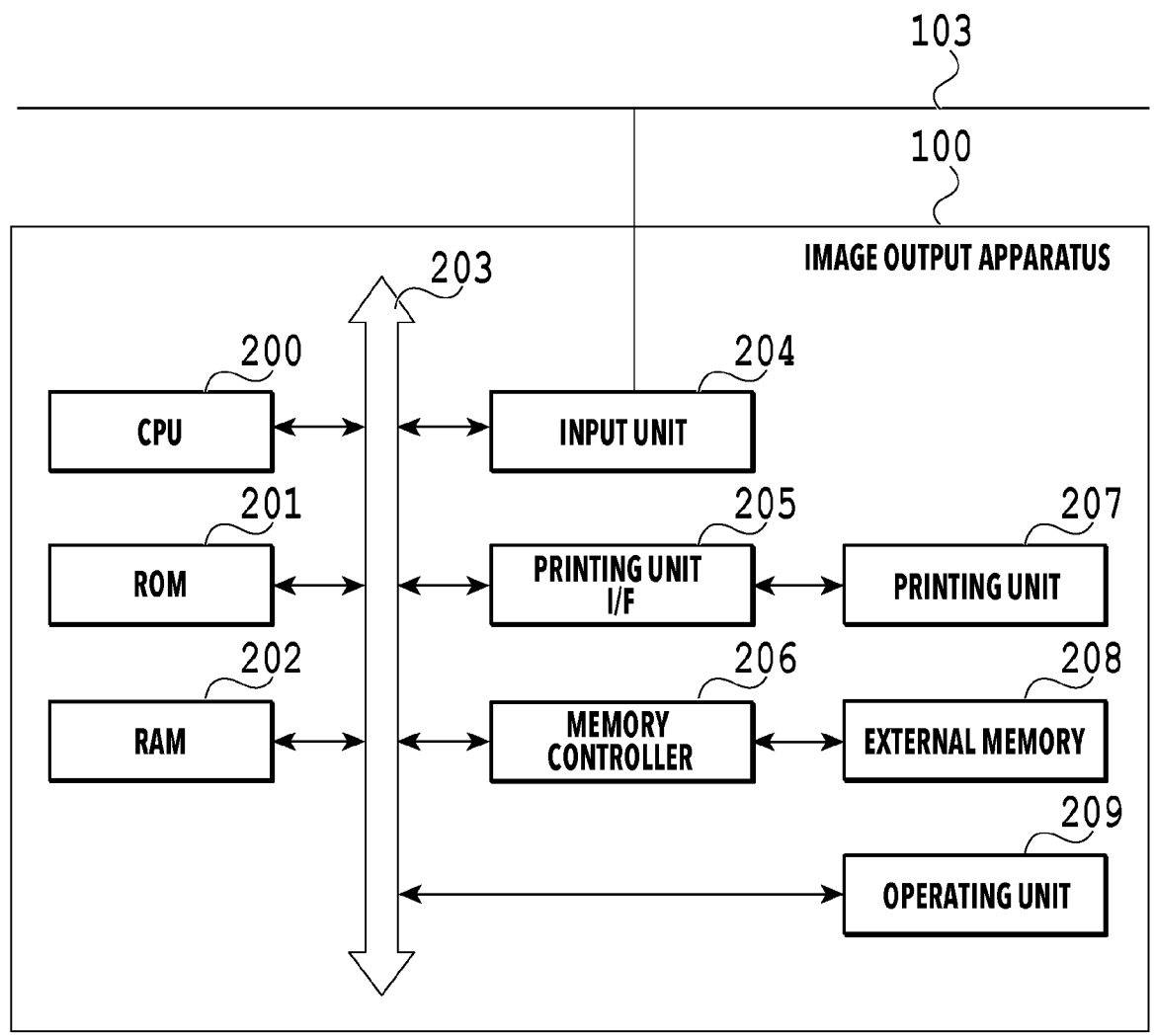
FIG. 2 is a diagram showing an example of a hardware configuration of an image output apparatus.

FIG. 2 is a diagram showing an example of a hardware configuration of the image output apparatus 100. The image output apparatus 100 includes a CPU 200, a ROM 201, a RAM 202, a system bus 203, an input unit 204, a printing unit I/F 205, a memory controller 206, a printing unit 207, an external memory 208, and an operating unit 209.

The image output apparatus 100 is controlled by the CPU 200. The CPU 200 operates based on a control program stored in a ROM for a program of the ROM 201, a control program stored in the external memory 208, or the like. The CPU 200 outputs an image signal to the printing unit (printer engine) 207 connected to the printing unit I/F 205 via the system bus 203. The CPU 200 is configured to be capable of communication processing with the PC 102 via the input unit 204 and can inform the PC 102 of information in the image output apparatus 100 (for example, the status information). The CPU 200 can also receive, from the PC 102, input of output data to be output to the printing unit 207 via the input unit 204 as the print job. The CPU 200 may be a dedicated circuit including an ASIC. The RAM 202 is a RAM which functions as a main memory, a work area, or the like of the CPU 200. The RAM 202 is configured such that memory capacity thereof can be expanded with an optional RAM connected to an expansion port (not shown). The external memory 208 is a memory including a hard disk (HDD), an IC card, or the like and access thereto is controlled by the memory controller 206. The external memory 208 can be connected as an option and stores font data, an emulation program, form data, information about a sheet registered in the image output apparatus, sheet attribute information, or the like. The operating unit 209 includes an operation panel and is configured such that the operating unit can display various types of information and input various operations by the user. The status information about the image output apparatus 100 is stored in the ROM 201, the RAM 202, or the external memory 208.

Figure 3:
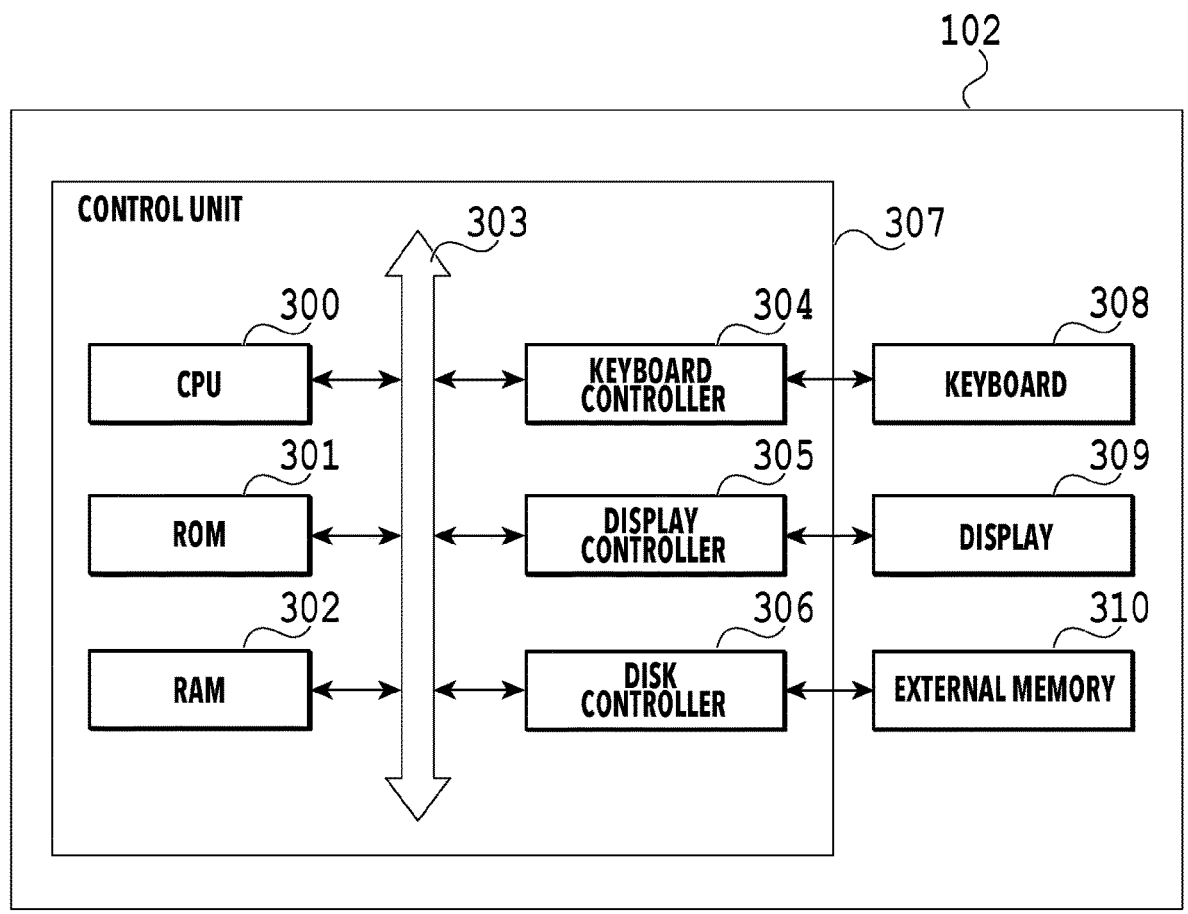
FIG. 3 is a diagram showing a hardware configuration of a PC.

FIG. 3 is a diagram showing a hardware configuration of the PC 102. The PC 102 includes a control unit 307, a keyboard 308, a display 309, and an external memory 310. The control unit 307 includes a CPU 300, a ROM 301, a RAM 302, a main bus 303, a keyboard controller 304, a display controller 305, and a disk controller 306.

The CPU 300 reads out, to the RAM 302, various programs including a control program, a system program, an application program, or the like from the external memory 310 via the disk controller 306. The CPU 300 executes the various programs read out to the RAM 302 to perform various types of data processing or to perform display control of the display 309. The CPU 300 may read out a control program or the like from the ROM 301.

The disk controller 306 controls access to the external memory 310 including an HDD, a CD-ROM, a DVD-ROM, a USB, or the like. The RAM 302 is configured such that capacity thereof can be expanded with an optional RAM (not shown) or the like and is mainly used as a work area of the CPU 300. The keyboard controller 304 controls key input done by the keyboard 308 or a pointing device (not shown). The display controller 305 controls display of the display 309 which is a display unit. The display 309 may be externally provided for the PC 102. The main bus 303 connects respective units and the CPU 300 controls the respective units via the main bus 303.

The hardware configurations shown in FIGS. 2 and 3 are merely examples and it is not necessary to include all of these configurations and a configuration which has not been described above may be included.

Functional Blocks

Figure 4:
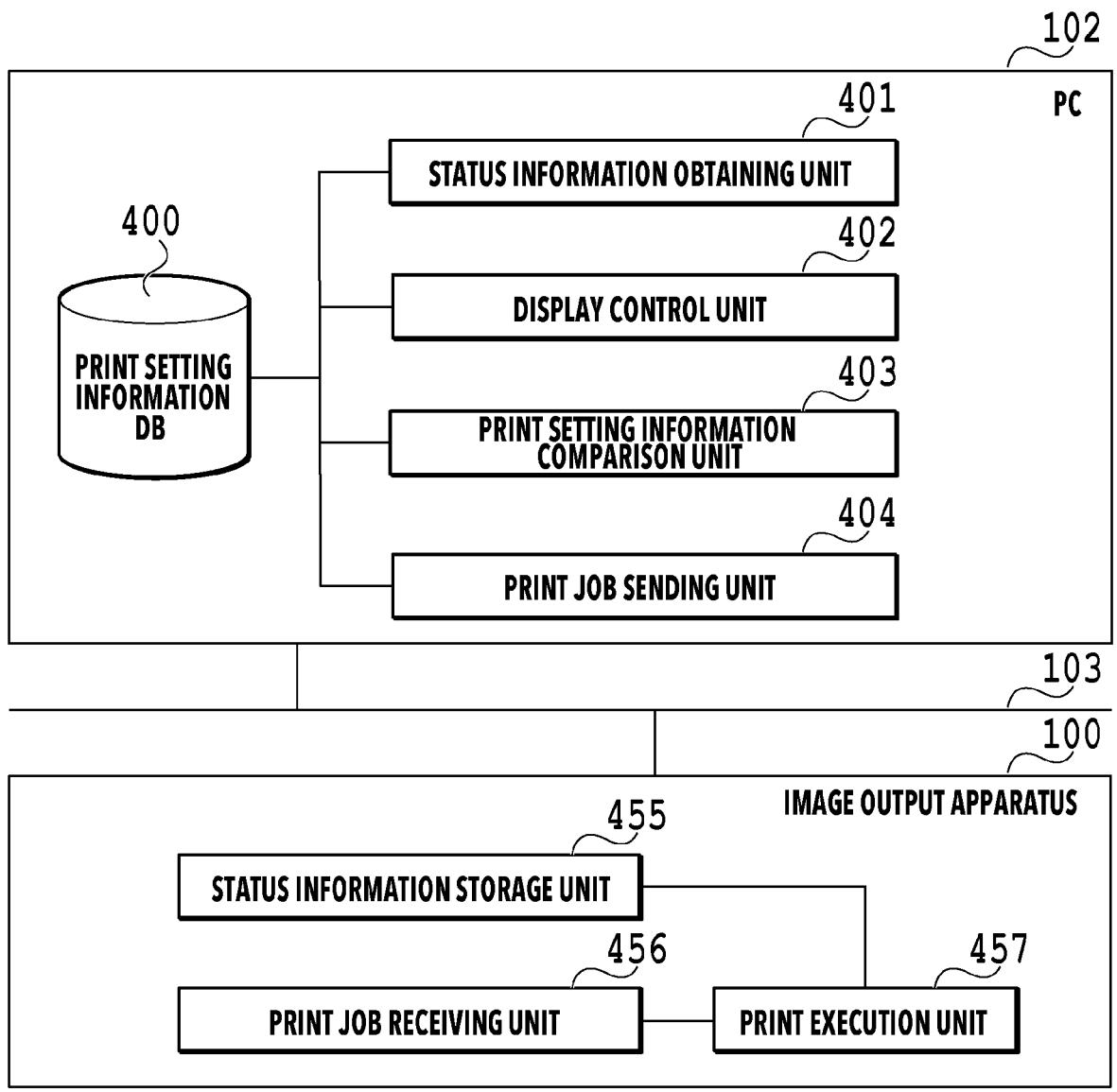
FIG. 4 is a diagram showing functional blocks in the print system.

FIG. 4 is a diagram showing functional blocks in the print system of the present embodiment including the PC 102 and the image output apparatus 100.

First, functional blocks in the image output apparatus 100 will be described. The image output apparatus 100 has a status information storage unit 455, a print job receiving unit 456, and a print execution unit 457. The status information storage unit 455 consists of, for example, the ROM 201, the RAM 202, or the external memory 208. The print job receiving unit 456 and the print execution unit 457 are realized by the CPU 200 reading out, to the RAM 202, the control program stored in the ROM 201 or the like to be executed.

The status information storage unit 455 stores status information in which a sheet feeding state or a device setting state in the image output apparatus 100 is reflected. The sheet feeding state includes information about the mounting status of a sheet feeding port (for example, the number of trays on which roll paper is mounted), the kind of the sheet mounted on the sheet feeding port, or the like. The device setting state includes information about a color mode, image quality of printing, or the like. Specific examples will be described later with reference to FIG. 5. The print job receiving unit 456 receives the print job sent from the PC 102. The print execution unit 457 executes print processing based on the print job received by the print job receiving unit 456.

Next, functional blocks in the PC 102 will be described. The PC 102 has a print setting information DB 400, a status information obtaining unit 401, a display control unit 402, a print setting information comparison unit 403, and a print job sending unit 404. The print setting information DB 400 consists of the RAM 302 or the external memory 310. The status information obtaining unit 401, the display control unit 402, the print setting information comparison unit 403, and the print job sending unit 404 are realized by the CPU 300 reading out, to the RAM 302, the control program stored in the ROM 301 or the like to be executed.

The print setting information DB 400 stores print setting information. The print setting information includes at least a print setting value 502 and status information 503 which will be described later with reference to FIG. 5. The print setting value 502 is a print setting value currently set in the PC 102. The status information 503 is status information that the status information obtaining unit 401 obtains from the status information storage unit 455 of the image output apparatus 100. The details thereof will be described later. The print setting information also includes information based on a printer driver already installed on the PC 102 and information based on a spooler.

The status information obtaining unit 401 obtains the status information from the status information storage unit 455 of the image output apparatus 100. The status information obtaining unit 401 obtains the status information from the image output apparatus 100 at predetermined timing to store the obtained status information in the print setting information DB 400. In a case where communication between the PC 102 and the image output apparatus 100 cannot be made due to movement of the PC 102, a break, or the like, it is impossible for the status information obtaining unit 401 to obtain the status information from the status information storage unit 455 of the image output apparatus 100. In such a case, the status information obtaining unit 401 obtains the status information off-line. Incidentally, the case where the communication between the PC 102 and the image output apparatus 100 cannot be made is not limited to the above examples and may be, for example, a state in which the image output apparatus 100 is powered off.

As will be described later, the status information includes various items. In a case where the PC 102 and the image output apparatus 100 cannot communicate with each other, the status information obtaining unit 401 obtains each item related to the print setting in an off-line state. On the other hand, in a case where communication per se between the PC 102 and the image output apparatus 100 can be made, but the configuration of a part of the image output apparatus 100 cannot be obtained from the status information storage unit 455, the status information obtaining unit 401 obtains the item in the off-line state.

The display control unit 402 performs control in which the screen for the print setting (hereinafter referred to as the print setting screen) is displayed on the display 309 based on the print setting information stored in the print setting information DB 400. Options in a case of changing the various print settings according to the information based on the printer driver are displayed on the print setting screen in a selectable mode. Further, the print setting values included in the print setting information are displayed on the print setting screen in a state in which the print setting values are being selected on the print setting screen. The user can change the various print settings by editing (changing) the print setting values on the print setting screen. The display control unit 402 causes the print setting information DB 400 to store the print setting value edited on the print setting screen.

Upon receipt of an instruction of print execution from the user, the display control unit 402 requests the print job sending unit 404 to generate and send the print job in the print setting according to the print setting values. The display control unit 402 further displays the warning based on the results of comparison performed by the print setting information comparison unit 403.

The print setting information comparison unit 403 compares the status information stored in the print setting information DB 400 (that is, information that the status information obtaining unit 401 obtains from the status information storage unit 455 of the image output apparatus 100) with the print setting value. The print setting information comparison unit 403 then informs the display control unit 402 of the comparison results.

FIG. 5 is a diagram showing an example of the print setting information stored in the print setting information DB 400. The print setting information includes parameters such as an ID 500 for uniquely identifying a setting item of the print setting, a setting item 501, which is a name indicating the setting item, the print setting value 502, and the status information 503. Although the print setting information also includes, as well as the information shown in FIG. 5, information indicating a value that the print setting value can take based on the printer driver for example, the description thereof is omitted here.

The print setting value 502 stores the current value of the print setting value and in a case where editing is performed on the print setting screen, the edited print setting value is stored.

The status information 503 is information about the respective image output apparatuses 100. In FIG. 5, status information 503a is status information about the image output apparatus 100a and status information 503b is status information about the image output apparatus 100b. Although a data structure in which the status information about the respective image output apparatuses 100 is combined into one as the print setting information is shown in FIG. 5, these pieces of status information may also be stored in the print setting information DB 400 as separate print setting information, may be managed by another file for each type of the parameters, or the type of the parameters other than the ones described above may be included in the print setting information.

Figure 6:
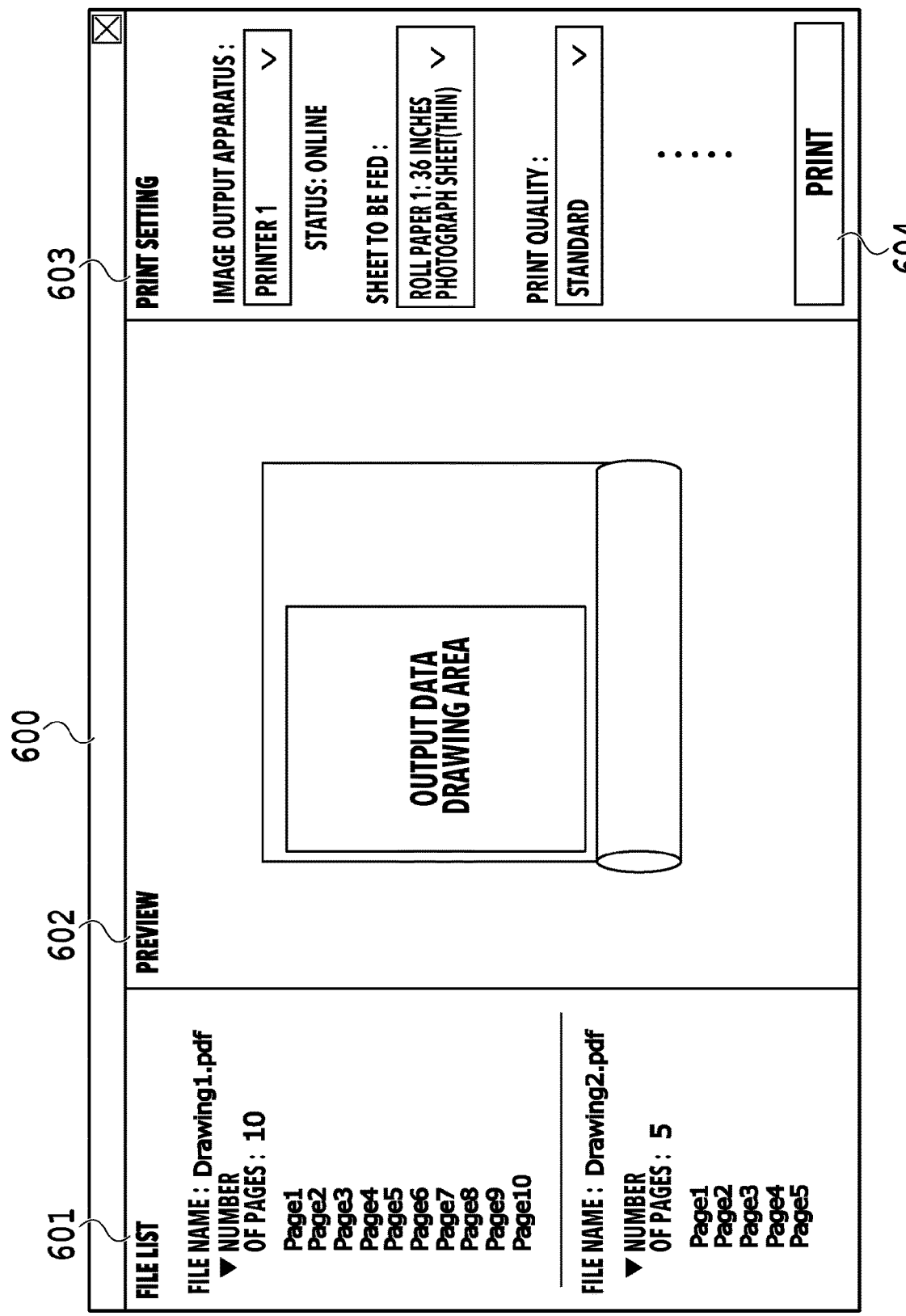
FIG. 6 is a diagram showing an example of a print setting screen.

FIG. 6 is a diagram showing an example of a print setting screen 600 displayed on the display 309 of the PC 102. The print setting screen 600 includes a file list display area 601, a preview display area 602, and a print setting area 603. The file list display area 601 is an area in which document information to be printed is displayed in a list for each document or for each page. The preview display area 602 is an area in which the layout of a page selected in the file list display area 601 is displayed as a preview. The print setting area 603 is an area in which the print setting value 502 of each of the various setting items 501 of the print setting is edited. The print setting screen 600 shown in FIG. 6 is merely an example and only the print setting area 603, for example, may be displayed as the print setting screen. A display area of another item may also be displayed on the print setting screen. Upon pushing down of a print button 604 by the user, the display control unit 402 receives this operation input to instruct the print job sending unit 404 to generate and send the print job. In the example of FIG. 6, "printer 1" (corresponding to the image output apparatus 100a in the present example) designated as the image output apparatus in the print setting area 603 is the image output apparatus selected as a print destination. The print job sending unit 404 generates the print job according to the print setting and sends the generated print job to the image output apparatus 100 (printer 1) selected as the image output apparatus which performs the printing.

Although an example in which the sheet feeding port, the kind of the sheet, and the size of the sheet of the setting items 501 of FIG. 5 are displayed as one group of information about "a sheet to be fed" is shown in FIG. 6, the print setting screen 600 may be naturally configured such that each setting item can be displayed and selected. The print setting screen 600 may also be configured such that another group of quality, layout, and the like can be displayed and selected as one group, which is different from the example of FIG. 6. Further, the file list display area 601 may be configured such that thumbnails are displayed in a list, whereby an overview of contents for each page can be obtained or may be configured such that the form of a list display can be switched on the screen.

In the present embodiment, in such print setting screen 600, in a case where the print setting value 502 set in the print setting area 603 is different from the status information 503 which can be obtained from the image output apparatus 100 selected as the print destination, the warning is displayed.

Figure 7A:
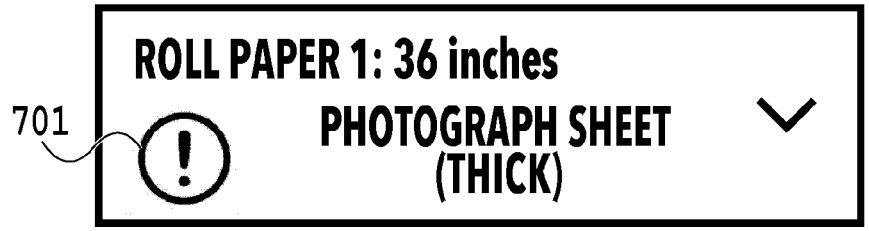
FIGS. 7A and 7B are diagrams showing examples of a warning display.
Figure 7B:
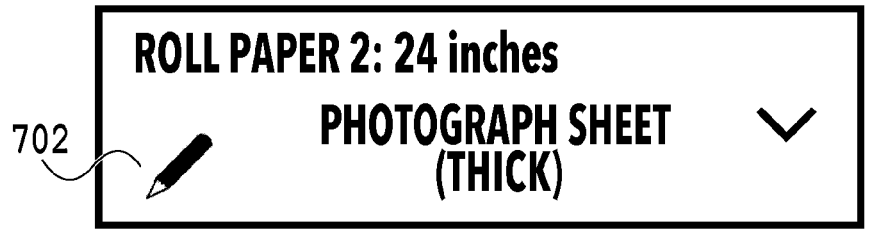

FIGS. 7A and 7B are diagrams showing examples of a warning display. In the present embodiment, the warning display can fall into two broad categories. The warning is displayed in the form of a predetermined icon. A first warning display is an example in which an off-line edited mark 702 indicating that editing has been performed off-line is displayed as shown in FIG. 7B. A second warning display is an example in which a print setting mismatch mark 701 is displayed as shown in FIG. 7A. The off-line edited mark 702 of FIG. 7B is referred to as the first warning display. The print setting mismatch mark 701 of FIG. 7A is referred to as the second warning display. The first warning display is displayed in a case where the user edits a setting item on which the PC has failed to obtain the status information 503. In other words, the first warning display is displayed in a case where the user edits the setting item indicating off-line as the status information 503. The second warning display is displayed in a case where the print setting value 502 is different from the status information 503 which has been successfully obtained.

First, the second warning display will be described. The display control unit 402 receives the comparison results between the print setting value 502 and the status information 503 from the print setting information comparison unit 403. In a case where the status information 503 is not set as off-line and the print setting value 502 is different from the status information 503, the print setting mismatch mark 701 is displayed as the second warning display. It is assumed that in FIGS. 7A and 7B, the image output apparatus 100a is selected to perform processing based on the status information 503a shown in FIG. 5. In the status information 503a of FIG. 5, "photograph sheet (thin)" is set as the type of the sheet of roll paper 1. This means that the sheet whose sheet type is the "photograph sheet (thin)" is set in a sheet feeding tray of the roll paper 1 in the image output apparatus 100a which is the print destination. FIG. 7A shows an example in which in the state described above, the user changes the type of the sheet to "photograph sheet (thick)" on the print setting screen 600, with the result that the print setting mismatch mark 701 is displayed. In a case where the status information 503a obtained from the image output apparatus 100a which is the print destination and the print setting value 502 do not match each other, it is possible to inform the user of a possibility of the print mistake by displaying the print setting mismatch mark 701 in the vicinity of the setting item.

Meanwhile, in a case where the status information obtaining unit 401 cannot obtain the status information from the status information storage unit 455 of the image output apparatus, for example, in a case where the PC 102 is incapable of communicating with the image output apparatus which is the print destination, the print setting information DB 400 stores status information indicating the off-line state. In this state, the print setting information comparison unit 403 informs the display control unit 402 that since the status information 503 indicates the off-line state, the status information 503 does not match the print setting value. The display control unit 402 does not immediately display the first warning display in a case where the print setting value 502 and the status information 503 do not match each other due to the off-line state. In this state, in a case where the user edits the print setting value, the display control unit 402 displays the off-line edited mark 702 as the first warning display in the vicinity of the edited setting item. After checking the off-line edited mark 702, the user can recognize that the setting item is an item in which no consistency between the print setting value and the status information has been checked. In a case where the user does not grasp the setting item (for example, the item of the sheet to be fed), it can be expected that the user will check the setting item in advance before the printing is executed. On the other hand, in a case where the user grasps the setting item, it can be expected that the user will instruct the print execution without waiting for obtaining of the status information. By displaying the off-line edited mark 702 in this manner, the print mistake can be suppressed also in a state in which the status information cannot be obtained. Incidentally, in a case where the user edits the print setting value in the off-line state, the print setting information DB 400 may store information indicating that the print setting value has been edited or a predetermined area including the RAM 302 may store the information indicating that the print setting value has been edited.

Figure 8:
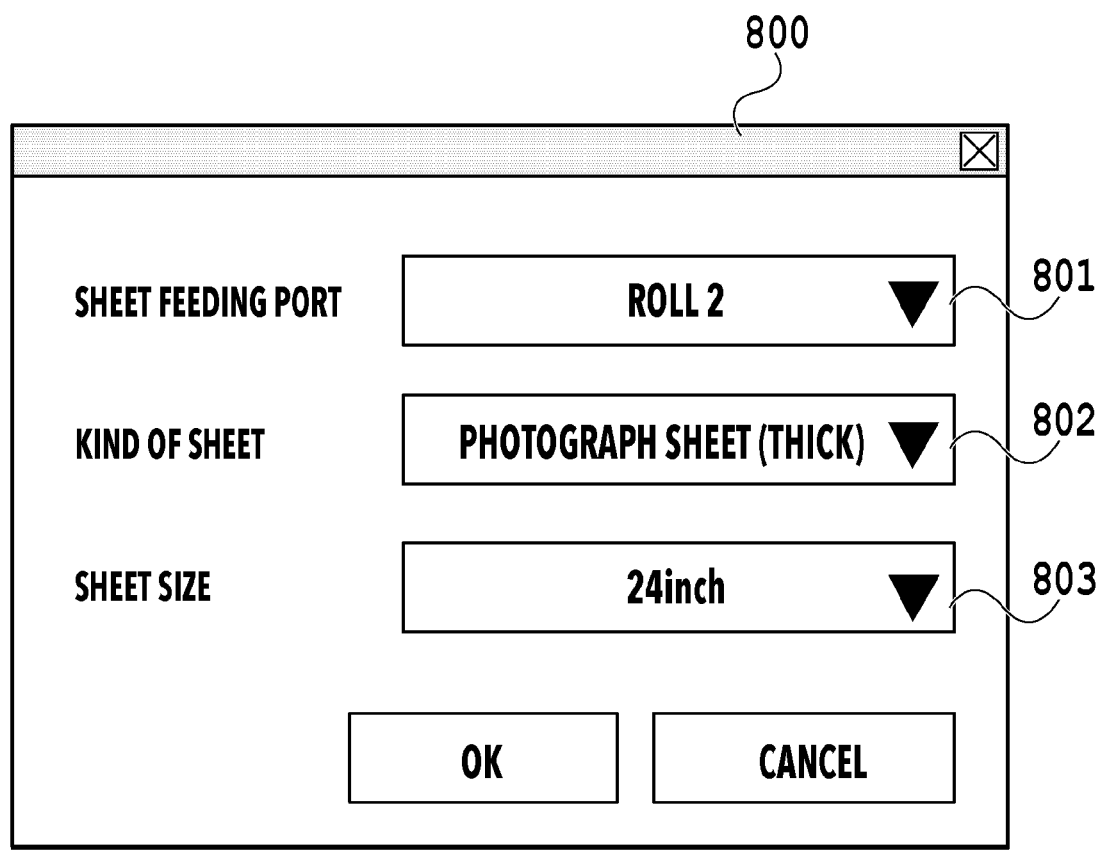
FIG. 8 is a diagram showing an example of an editing screen for editing print setting values.

FIG. 8 is a diagram showing an example of an editing screen 800 for editing the print setting values 502. In a case where the print setting values 502 are edited in a state in which the status information 503 cannot be obtained, the editing screen 800 shown in FIG. 8 is displayed. FIG. 8 shows an example of a screen displayed in response to selection of the item of the "sheets to be fed" by the user on the print setting screen 600 shown in FIG. 6. The user can set each item of a sheet feeding port 801, the kind of the sheet 802, and the size of the sheet 803 on the editing screen 800. The editing screen 800 is configured such that items which can be edited by the user can be displayed as options based on the information from the printer driver for example. FIG. 7B shows a diagram of a result in which the print setting values 502 have been edited on the editing screen 800 of FIG. 8. That is, since the user has edited the print setting values 502 related to the "sheets to be fed," the off-line edited mark 702 is displayed in the vicinity of the setting items of the "sheets to be fed." The marks shown in FIGS. 7A and 7B are merely examples and a mark other than these marks may also be displayed on the print setting screen 600.

Flowchart

Figure 9:
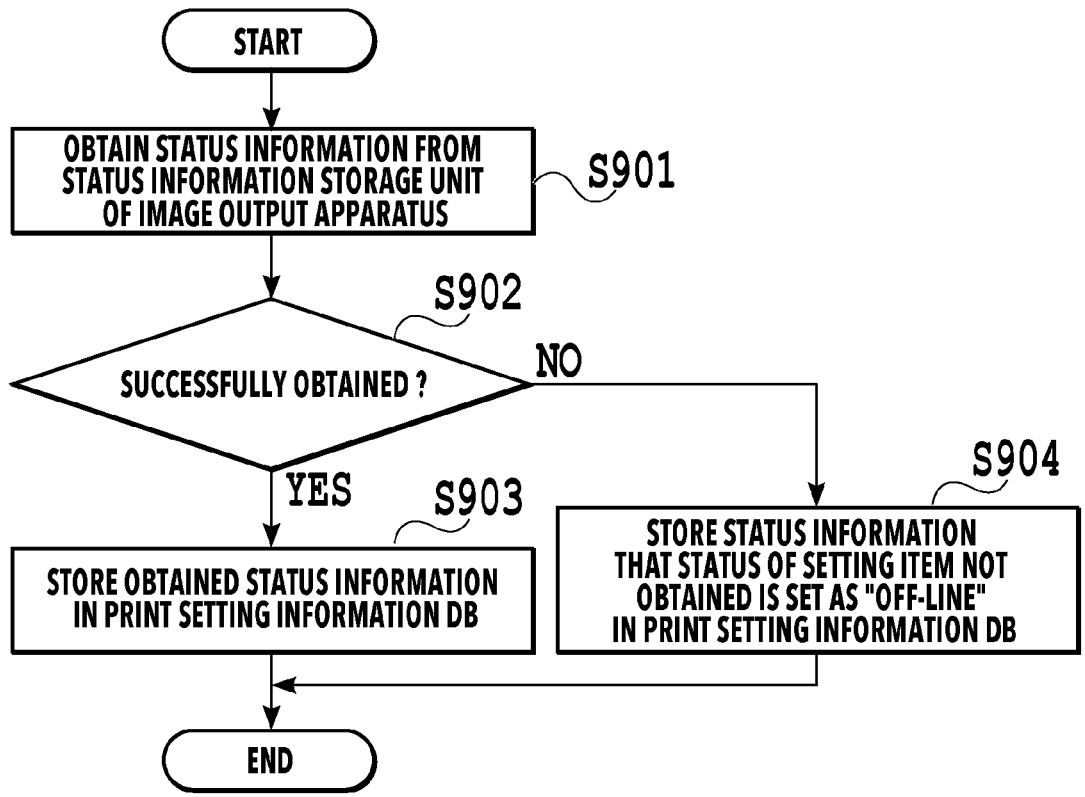
FIG. 9 is a flowchart showing an example of processing in which status information is obtained.

FIG. 9 is a flowchart showing an example of processing in which the PC 102 obtains the status information. The processing shown in FIG. 9 is realized by the CPU 300 of the PC 102 reading out, to the RAM 302, the program stored in the ROM 301 or the like to be executed. It should be noted that the sign "S" in the description of each step means a step in the flowchart (the same applies hereinafter in the present specification). The processing of FIG. 9 is realized by the CPU 300 functioning as the status information obtaining unit 401.

The processing of FIG. 9 is started at predetermined timing. For example, the processing may be regularly executed by the PC 102, may be executed at timing in which the print setting screen 600 shown in FIG. 6 is displayed, or may be executed triggered by user operation on the print setting screen 600.

In S901, the status information obtaining unit 401 obtains the status information stored in the status information storage unit 455 of the image output apparatus 100. The status information obtaining unit 401 can obtain the status information from each of the image output apparatuses 100 with which the PC 102 can communicate. In a case where, for example, the print setting screen 600 is displayed, the status information obtaining unit 401 may obtain only the status information about the image output apparatus selected as the image output apparatus which is the print destination. The status information obtaining unit 401 may obtain information also from the printer driver already installed on the PC 102 and from the spooler at the timing of S901.

In S902, the status information obtaining unit 401 determines whether the status information has been successfully obtained. In a case where the status information has been successfully obtained, the process proceeds to S903. In S903, the status information obtaining unit 401 stores the obtained status information in the print setting information DB 400 as the print setting information. In short, the status information obtaining unit 401 stores the obtained status information as the status information 503 corresponding to the image output apparatus 100 from which the status information has been obtained to end the process. On the other hand, in a case where the status information has not been obtained, the process proceeds to S904. In S904, the status information obtaining unit 401 stores the status information 503 in which the setting item 501 on which the status information has not been obtained is set as "off-line" in the print setting information DB 400 as the print setting information. After that, the status information obtaining unit 401 ends the process. The example of FIG. 5 shows an example in which "roll paper 2" is set as "off-line" because the status of the "roll paper 2" of the status information 503a cannot be obtained from the status information about the image output apparatus 100a. The processing in the flowchart of FIG. 9 may be repeatedly executed the number of times which is equal to the number of the setting items 501 or processing may be performed in one time on all of the setting items 501.

In such a case where the status information obtaining unit 401 cannot communicate with the status information storage unit 455 of the image output apparatus 100 to be the target, the status information obtaining unit 401 cannot obtain anything as the status information 503. In this case, all of the status information 503 of the image output apparatus 100 to be the target may be set as "off-line." Meanwhile, there is a case where although the status information obtaining unit 401 can communicate with the status information storage unit 455 of the image output apparatus 100 to be the target, the image output apparatus 100 does not have the function of notifying the status information about a part of the setting items. In such a case, as shown in FIG. 5 as the status information 503a, there is a case where both the setting item to be set as "off-line" and the setting item on which the status information 503 can be normally obtained exist.

The description will be made more specifically. Some image output apparatuses 100 have different ranges of the status information which can be returned to the PC 102 in response to an obtaining request from the status information obtaining unit 401. For example, there is a case where while an image output apparatus A is configured to send the name of the sheet being fed as the status information, an image output apparatus B cannot send the name of the sheet being fed as the status information. In addition, in some image output apparatuses 100, it is possible to optionally add a sheet feeding port. For example, in some image output apparatuses 100, it is possible to optionally add a second tray as a sheet feeding tray for the roll paper. In some image output apparatuses 100, it is possible to attach such an additional optional unit, but it is impossible to obtain the status information about the additionally attached unit to store the information in the status information storage unit 455 as the status information. In the example of FIG. 5, the "roll 2" is optionally mounted on the image output apparatus 100a as described above and this is an example in which a case where the status information about the "roll 2" cannot be sent to the PC 102 is assumed. Although an example in which only a part of the setting items are set as off-line is shown in FIG. 5, as described above, in a case where there is the image output apparatus 100 incapable of communicating with the PC 102, all of the setting items of the image output apparatus are set as off-line.

Figure 10:
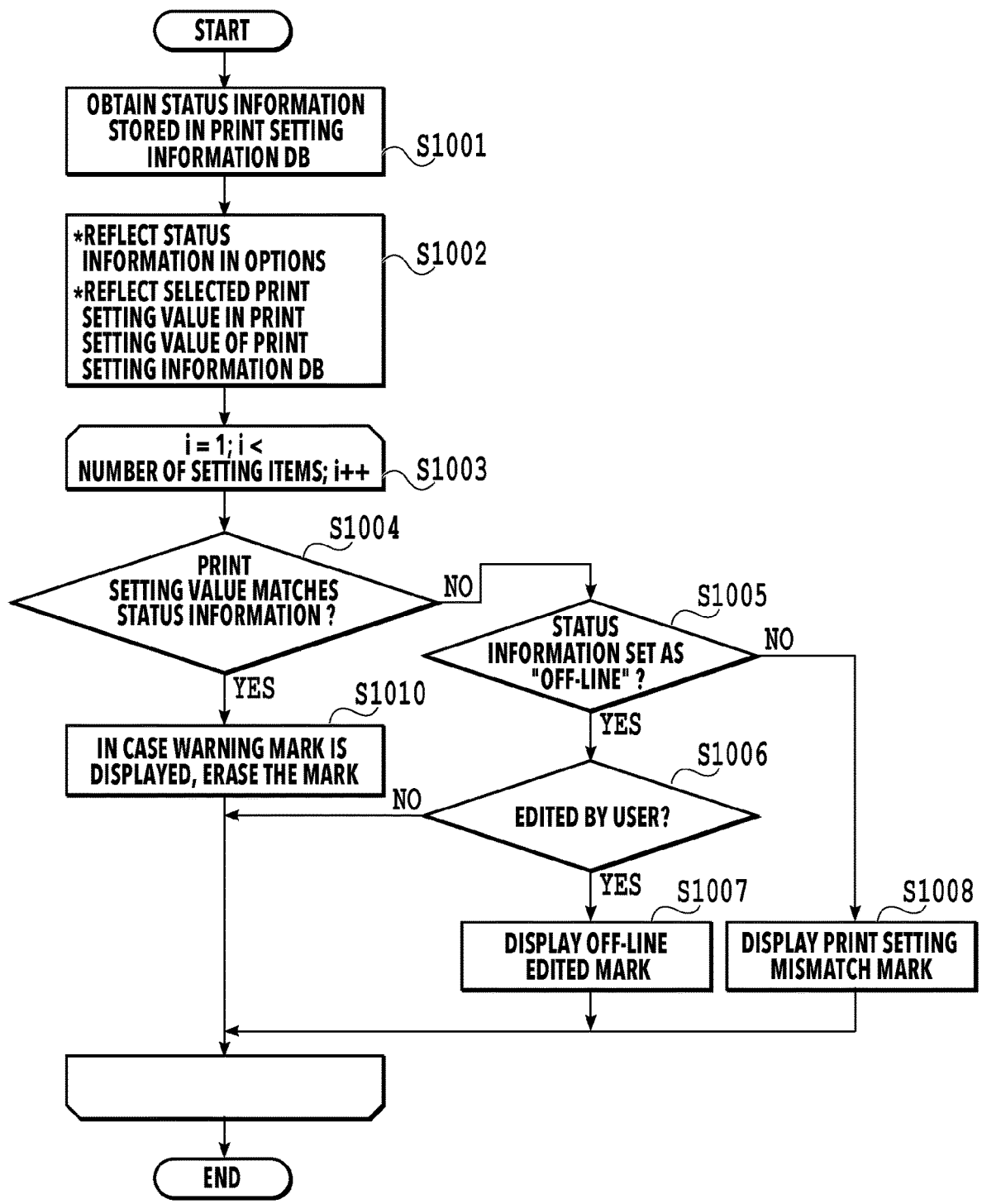
FIG. 10 is a flowchart showing an example of processing in which the print setting screen is displayed.

FIG. 10 is a flowchart showing an example of processing in which the PC 102 displays the print setting screen 600. The processing shown in FIG. 10 is realized by the CPU 300 of the PC 102 reading out, to the RAM 302, the program stored in the ROM 301 or the like to be executed. The processing of FIG. 10 is realized by the CPU 300 functioning as the display control unit 402. The flowchart of FIG. 10 is started at timing in which the PC 102 displays the print setting screen 600, or at timing in which the print setting value is updated on the print setting screen 600.

In S1001, the display control unit 402 obtains the print setting information stored in the print setting information DB 400. In S1002, the display control unit 402 displays the print setting screen 600 based on the print setting information obtained in S1001. More specifically, the display control unit 402 displays options on the print setting screen 600 in a selectable manner based on the print setting information of the print setting information DB 400. Further, in a case where the status information 503 of the print setting information is set as off-line, the display mode of the options may be changed such that it can be understood that the status information 503 is set as off-line. For example, the display of "status" in the print setting area 603 of FIG. 6 may be changed to off-line according to the status information 503 or the setting item set as off-line may be lightly displayed as compared with a setting item obtained on-line. The print setting value selected on the print setting screen 600 is then reflected in the print setting value 502 of the print setting information DB 400. In some cases, the print setting value selected on the print setting screen 600 is set by the user operation and in some cases, this is automatically selected by the display control unit 402.

Next, in S1003 through S1010, the display control unit 402 repeats the processing the number of times which is equal to the number of the setting items 501. Here, a setting item to be handled is determined one by one in order of sorting of the ID 500 to perform the processing.

In S1004, the display control unit 402 causes the print setting information comparison unit 403 to compare the print setting value 502 set corresponding to the setting item 501 to be handled with the status information 503 to obtain the comparison results. In a case where the print setting value 502 and the status information 503 match each other, the process proceeds to S1010 and in a case where the print setting value 502 and the status information 503 do not match each other, the process proceeds to S1005.

In S1010, in a case where a warning mark is displayed in the print setting value 502 corresponding to the setting item 501 to be handled, the display control unit 402 erases the warning mark. This step is a step performed in a case where, for example, the user edits the print setting value on the print setting screen 600 and as a result, the print setting value matches the status information 503. This is because there is no need to display the warning mark in a case where the print setting value 502 and the status information 503 match each other. This warning mark is the print setting mismatch mark 701 of FIG. 7A in some cases and is the off-line edited mark 702 of FIG. 7B in some cases. Examples in which the off-line edited mark 702 is canceled include a case where status is changed from the status in which the PC cannot communicate with the image output apparatus 100 to the status in which the PC can communicate with the image output apparatus 100 and further, it is determined again and checked that the print setting value 502 and the status information 503 match each other. After that, the process returns to a loop starting with S1003. In a case where the warning mark is not displayed, a step S1010 is skipped to return to the loop starting with S1003.

On the other hand, in a case where the print setting value 502 corresponding to the setting item 501 to be handled does not match the status information 503, the process proceeds to S1005 and the display control unit 402 determines whether the status information 503 is set as off-line. As described above, also in a case where the status information 503 is set as off-line, the print setting value 502 does not match the status information 503. In a case where the status information 503 is set as off-line, the process proceeds to S1006 and in a case where the status information 503 is not set as off-line, the process proceeds to S1008. In a case where the status information 503 is not set as off-line, the status information 503 can be normally obtained and is different from the print setting value 502. For this reason, the display control unit 402 displays in S1008 the print setting mismatch mark 701 at a spot of the corresponding setting item in the print setting screen 600. The process then returns to the loop starting with S1003. Meanwhile, in a case where the status information 503 is set as off-line, the display control unit 402 determines in S1006 whether the setting item 501 to be handled has been edited by the user. In a case where the setting item 501 has been edited by the user, the process proceeds to S1007 in which the display control unit 402 displays the off-line edited mark 702 at the spot of the corresponding setting item in the print setting screen 600. The process then returns to the loop starting with S1003. Also in a case where it is determined in S1006 that the setting item 501 has not been edited by the user, the process returns to the loop starting with S1003. The above-described steps are repeated and in a case where the processing the number of times of which is equal to the number of the setting items ends and a condition for ending the loop starting with S1003 is met, the processing of the present flowchart ends.

As described above, in the present embodiment, even in a case where the information processing apparatus cannot obtain the status of the image output apparatus, an appropriate warning can be presented to the user. For example, even in a case where the information processing apparatus cannot communicate with the image output apparatus, the appropriate warning related to the print setting can be presented to the user. This makes it possible to inform the user of a possibility that the print mistake can occur, thereby suppressing the print mistake from occurring.

Second Embodiment

In the first embodiment, the examples in which the predetermined warning displays are performed on the print setting screen 600 have been described. Here, in the state in which the user does not push the print execution button and the print job is not generated, in a case where the situation allows cancellation of the warning, it is preferable that the warning be automatically canceled. For example, in a case where the print setting value is edited in the state in which the PC 102 cannot communicate with the image output apparatus 100, as described in the first embodiment, the off-line edited mark 702 is displayed. In the present example, a case where after that, before the user pushes down the print execution button, the PC can communicate with the image output apparatus 100 is assumed. In the present embodiment, processing to cause the value selected on the print setting screen (that is, the print setting value) to match the status information obtained after communication has been made possible is performed. As a result, the setting value edited by the user is changed to match the status information, with the result that the off-line edited mark 702 is not displayed.

Figure 11:
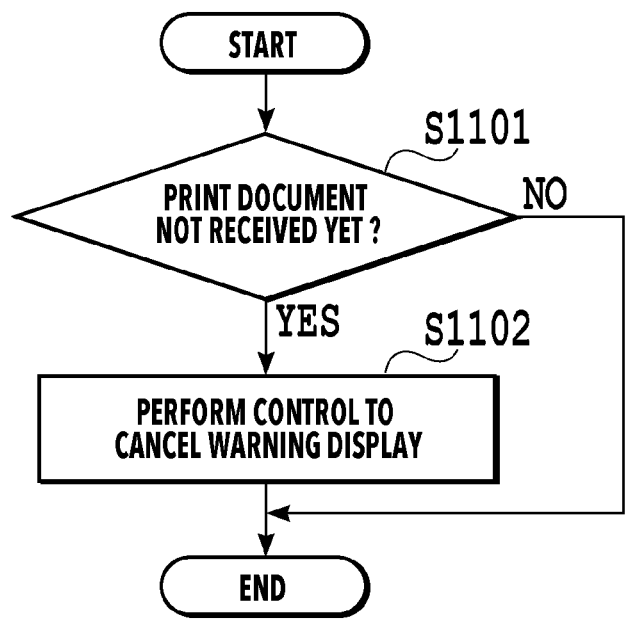
FIG. 11 is a flowchart showing an example of processing performed by the PC.

FIG. 11 is a flowchart showing an example of processing performed by the PC 102. The processing shown in FIG. 11 is realized by the CPU 300 of the PC 102 reading out, to the RAM 302, the program stored in the ROM 301 or the like to be executed. The processing of FIG. 11 is realized by the CPU 300 functioning as the display control unit 402. The flowchart of FIG. 11 can be performed at any timing. For example, the flowchart may be performed subsequently to the processing shown in FIG. 10 or may be performed in parallel with the processing of FIG. 10. Determination may be made in real time according to the latest state of the image output apparatus 100 by regularly performing the processing of FIG. 11.

In S1101, the display control unit 402 determines whether a print document has not been received yet. For example, in a case where an instruction to generate the print job is not output to the print job sending unit 404 including a case where the operation of the print button is not received on the print setting screen 600, it is determined that the print document has not been received yet. Also in a case where the print setting screen 600 is opened by the user regardless of the print document, it is determined that the print document has not been received yet. In a case where the print document has already been received, the process is ended. In a case where the print document has not been received yet, the process proceeds to S1102 to execute control in which the warning display is canceled. More specifically, as described above, in a case where the PC 102 can communicate with the image output apparatus 100, control is performed in which the print setting value for which the off-line edited mark 702 is selected on the print setting screen 600 is caused to match the status information obtained after communication has been made possible. As a result, the set value already edited by the user matches the status information resulting in a state in which the off-line edited mark 702 is not displayed. The determination in S1101 may be made in consideration of whether a change in the print setting on the print setting screen 600 has been performed by the user. For example, in the state in which the PC 102 cannot communicate with the image output apparatus 100, in a case where the change in the print setting on the print setting screen 600 has not been performed by the user, the off-line edited mark 702 is not displayed. Therefore, in a case where the change in the print setting on the print setting screen 600 has not been performed by the user, the processing may be performed such that an answer would be NO in S1101.

As described above, according to the present embodiment, the warning display can be automatically canceled.

Third Embodiment

In the first embodiment, the example in which the warning display is performed in the print setting area 603 of the print setting screen 600 has been described. In the present embodiment, an example in which the warning display is performed also in the file list display area 601 or the preview display area 602 of the print setting screen 600 will be described. Although the example in which the predetermined mark is displayed as the warning display in the print setting area 603 has been described, in the present embodiment, information is displayed partially differently, even in a case where the warning has the same contents.

Figure 12:
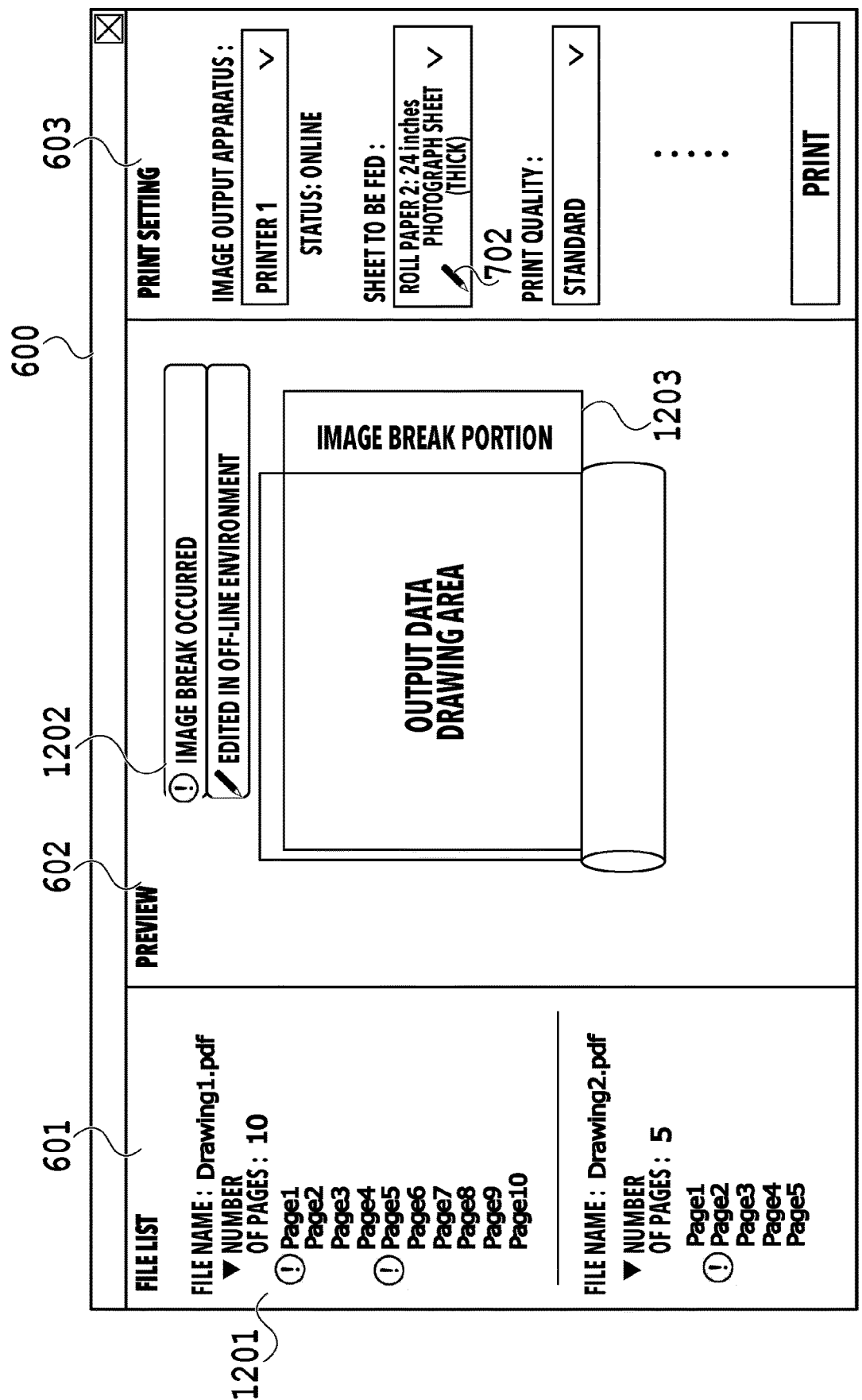
FIG. 12 is a diagram showing an example of the print setting screen.

FIG. 12 is a diagram showing an example of the print setting screen 600 of the present embodiment. In FIG. 12, an image break warning indicating that as a result of the change in the print setting in the state in which the PC 102 cannot communicate with the image output apparatus, a part of the page of the print document which has been received goes beyond an output sheet is displayed. In the print setting area 603, since the user has edited the setting of the sheet to be fed, the off-line edited mark 702 is displayed as described in the first embodiment.

In the present embodiment, corresponding warning displays are further displayed also in the file list display area 601 and the preview display area 602. The file list display area 601 is an area in which a plurality of documents and pages are displayed in a list. Thus, warning marks 1201 are displayed in the file list display area 601 in a form that it is easy to recognize pages in which problems occur. The preview display area 602 displays, as a preview, the layout of the page selected in the file list display area 601. Warning marks 1202 displaying pieces of detailed information the number of which is equal to the number of the problems are displayed in the preview display area 602. A warning mark 1203 indicating a spot in which an image break portion occurs is also displayed to easily visualize the problems. Incidentally, the spot in which the image break portion occurs can be specified in this manner from the print setting information stored in the print setting information DB 400. That is, as described above, the print setting information includes the information based on the printer driver and the information based on the spooler as well as the information shown in FIG. 5. Therefore, even in a case where the status information 503 cannot be obtained appropriately, the display control unit 402 can specify a spot in which an error occurs based on the information described above.

As described above, in the present embodiment, the warning mark suitable for each of the areas on the print setting screen 600 can be displayed. The warning mark is additionally displayed or the form of the warning mark is changed in the manner described above, whereby it becomes easier for the user to recognize the warning contents.

The forms of the warning displays shown in FIG. 12 are merely examples and the form is not limited to these. The form may also be configured such that the user can customize which mark to be displayed and a relationship between a place at which the mark is displayed and the mark, or may be configured such that information related to the warning occurring as of that point in time is presented to the user in an appropriate form according to processing status in a case of receiving the print document for example.

Fourth Embodiment

The examples in which the warning displays are performed have been described in the embodiments described above. In the present embodiment, an example in which a solution method is presented to the user in such a state in which the warning is displayed will be described.

Figure 13:
FIG. 13 is a diagram showing an example of a mark with a solution including a solution method.

FIG. 13 is a diagram showing an example of a mark with a solution 1301 including the solution method as the warning display. By displaying the mark with a solution 1301 as shown in FIG. 13, the warning display and the solution method can be presented to the user at the same time. Naturally, in a case where, for example, the mark with a solution 1301 cannot be displayed due to system constraints or the like, the mark with a solution 1301 is not displayed as the mark and the solution method may be additionally displayed in text or the like. Further, the mark with a solution 1301 may be displayed on the print setting screen 600 or may be displayed on a screen different form the print setting screen 600.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-182780, filed Oct. 30, 2020, which is hereby incorporated by reference wherein in its entirety.

What is claimed is:

1. An information processing apparatus configured to be capable of communicating with an image output apparatus comprising:
   one or more memories storing instructions;
   one or more processors executing the instructions to:
   obtain status information indicating status of the image output apparatus from the image output apparatus;
   display a setting screen for setting print setting on a display unit; and
   store, in a case where the status information fails to be obtained, information indicating a failure to obtain the status information in a memory;
   wherein in a case where the information indicating the failure to obtain the status information has been stored in the memory, and thereafter a set value set on the setting screen is changed, a predetermined warning display is displayed on the setting screen.

2. The information processing apparatus according to claim 1, wherein the predetermined warning display is displayed for each setting item of the print setting and the predetermined warning display related to the setting item including the changed set value is displayed.

3. The information processing apparatus according to claim 1, wherein a display mode of the predetermined warning display varying according to an area on the setting screen is set.

4. The information processing apparatus according to claim 1, wherein in a case of displaying the predetermined warning display, information indicating a solution method is also displayed.

5. The information processing apparatus according to claim 1, wherein in a state in which the predetermined warning display is displayed and a print document is not received, in a case where the status information is successfully obtained, the set value is changed in accordance with the obtained status information.

6. The information processing apparatus according to claim 1, wherein in a state in which the predetermined warning display is displayed and the status information is successfully obtained in a case where the changed set value match the status information successfully obtained, a display of the predetermined warning display is ended.

7. The information processing apparatus according to claim 6, wherein in a case where the changed set value does not match the status information successfully obtained, a second warning display different from a first warning display which is the predetermined warning display is displayed.

8. The information processing apparatus according to claim 1, wherein in a case where the status information is successfully obtained and the set value set on the setting screen does not match the obtained status information obtained, a second warning display different from a first warning display which is the predetermined warning display is displayed.

9. The information processing apparatus according to claim 7, wherein a predetermined icon for each of the first warning display and the second warning display are enabled to be displayed.

10. A method for controlling an information processing apparatus configured to be capable of communicating with an image output apparatus comprising:
    obtaining status information indicating status of the image output apparatus from the image output apparatus;
    displaying a setting screen for setting print setting on a display unit, and
    storing in a case where the status information fails to be obtained, information indicating a failure to obtain the status information in a memory;
    wherein in a case where the information indicating the failure to obtain the status information has been stored in the memory, and thereafter a set value set on the setting screen is changed, a predetermined warning display is displayed on the setting screen.

11. A non-transitory computer readable storage medium storing a program which causes a computer to execute a method for controlling an information processing apparatus configured to be capable of communicating with an image output apparatus, the method comprising:
    obtaining status information indicating status of the image output apparatus from the image output apparatus;
    displaying a setting screen for setting print setting on a display unit; and
    storing in a case where the status information fails to be obtained, information indicating a failure to obtain the status information in a memory;
    wherein in a case where the information indicating the failure to obtain the status information has been stored in the memory, and thereafter a set value set on the setting screen is changed, a predetermined warning display is displayed on the setting screen.

* * * * *